United States Patent
Chung et al.

(10) Patent No.: US 9,795,943 B2
(45) Date of Patent: Oct. 24, 2017

(54) METHOD OF PREPARING LITHIUM ADSORPTION STRUCTURE HAVING LARGE SURFACE AREA

(71) Applicant: KOREA INSTITUTE OF GEOSCIENCE AND MINERAL RESOURCES, Daejeon (KR)

(72) Inventors: Kang-Sup Chung, Daejeon (KR); Byoung-Gyu Kim, Daejeon (KR); Taegong Ryu, Daejeon (KR); Jungho Ryu, Daejeon (KR); In-Su Park, Gyeryong-si (KR); Hye-Jin Hong, Dejeon (KR); Jae-chun Lee, Daejeon (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 0 days.

(21) Appl. No.: 15/007,735

(22) Filed: Jan. 27, 2016

(65) Prior Publication Data

US 2016/0214083 A1 Jul. 28, 2016

(30) Foreign Application Priority Data

Jan. 28, 2015 (KR) ........................ 10-2015-0013408

(51) Int. Cl.
*B01J 20/32* (2006.01)
*B01J 20/06* (2006.01)
(Continued)

(52) U.S. Cl.
CPC ........... *B01J 20/3236* (2013.01); *B01J 20/06* (2013.01); *B01J 20/28016* (2013.01);
(Continued)

(58) Field of Classification Search
CPC .. B01J 20/3236; B01J 20/06; B01J 20/28016; B01J 20/3078; B01J 20/321; B01J 20/3021; B01J 20/00–20/41; C23C 24/04
See application file for complete search history.

(56) References Cited

FOREIGN PATENT DOCUMENTS

JP 201 301 241 A * 1/2013
KR 100245808 B1 12/1999
(Continued)

OTHER PUBLICATIONS

Hong et al., "Spray deposition of LiMn2O4 nanoparticle-decorated multiwalled carbon nanotube films as cathod material for lithium-ion batteries," Thin Solid Films 547 (2013) 68-71.*

*Primary Examiner* — Anthony J Zimmer
(74) *Attorney, Agent, or Firm* — Hauptman Ham, LLP

(57) ABSTRACT

Provided are a lithium adsorbent prepared using an aerosol deposition method, including (a) synthesizing lithium manganese oxide powder, and (b) coating the lithium manganese oxide powder on a surface of a substrate by the aerosol deposition method, and a method of preparing the same. The lithium adsorbent is characterized in that the lithium manganese oxide powder may be directly coated on various substrates using the aerosol deposition method, thereby greatly reducing a decrease of a lithium recovery rate even after a long time has lapsed.

Further, the lithium adsorbent having a large surface area prepared by the preparation method of the present invention is characterized by being easily handled, being selectively reacted with lithium ions, having a larger adsorption area, being physically and chemically stable, and being used reversibly.

9 Claims, 1 Drawing Sheet

(51) Int. Cl.
*B01J 20/28* (2006.01)
*B01J 20/30* (2006.01)
*C23C 24/04* (2006.01)

(52) U.S. Cl.
CPC ....... *B01J 20/3021* (2013.01); *B01J 20/3078* (2013.01); *B01J 20/321* (2013.01); *C23C 24/04* (2013.01)

(56) References Cited

FOREIGN PATENT DOCUMENTS

| KR | 1020030009509 A | 1/2003 |
| KR | 1020030028447 A | 4/2003 |
| KR | 1020050045793 A | 5/2005 |
| KR | 1020100036056 A | 4/2010 |

\* cited by examiner

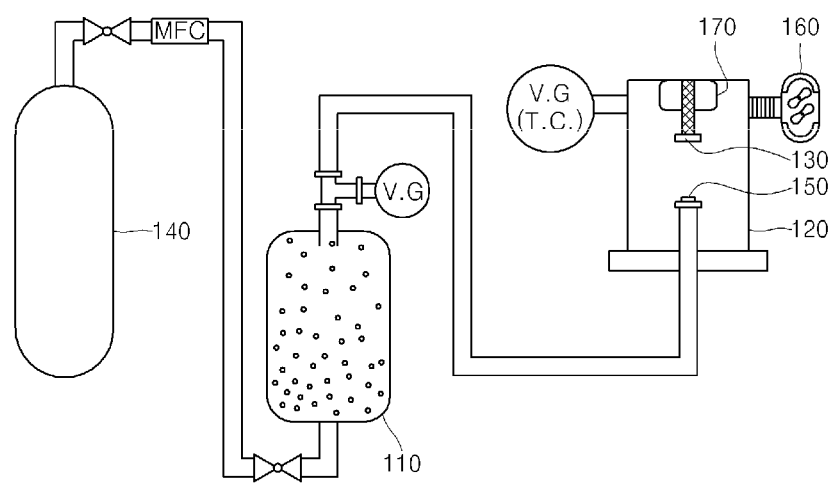

METHOD OF PREPARING LITHIUM ADSORPTION STRUCTURE HAVING LARGE SURFACE AREA

CROSS-REFERENCE TO RELATED APPLICATIONS

This application claims priority under 35 U.S.C. §119 to Korean Patent Application No. 10-2015-0013408, filed on Jan. 28, 2015, in the Korean Intellectual Property Office, the disclosure of which is incorporated herein by reference in its entirety.

TECHNICAL FIELD

The following disclosure relates to a method of preparing a lithium adsorption structure having a large surface area.

BACKGROUND

Lithium and lithium compounds are used in a very wide range of fields such as ceramics, secondary battery materials, refrigerant adsorbents, catalysts and medicines, and have attracted attention as nuclear fusion energy resources. Also, with the commercialization of high-capacity batteries, electric vehicles and the like, the demand of lithium and lithium compounds has become a growing trend. In view of this, considering that the worldwide reserves of lithium land resources are only 2 to 9 million tons, development for securing lithium resources other than from land is desperately needed. For this, studies for effectively collecting a trace amount of lithium dissolved in an aqueous solution such as sea water, brine and a waste solution of a lithium battery are currently being conducted, and the main concern of these studies is to develop a high performance adsorbent having high selectivity and excellent adsorption and desorption performance for a lithium ion.

Conventionally, as the fruit of the above studies, a method of preparing powder which is easy to adsorb and desorb lithium using manganese oxides as a raw material by a solid state reaction method or a gel method is known in the art, and the powder prepared by the method has been used as positive electrode materials for a lithium secondary battery (Korean Patent Registration No. 10-0245808, Korean Patent Laid-Open Publication No. 10-2003-0028447, and the like), lithium adsorbent materials, and the like.

However, since using a lithium adsorbent in a powder state is accompanied by handling inconvenience, it is necessary to use it in a molded form, and for example, as disclosed in Korean Patent Laid-Open Publication No. 10-2003-9509, a method in which the powder is mixed with alumina powder, and then the mixture of the powder and alumina powder is lumped using a pore forming agent such as PVC, thereby preparing an adsorbent in a bead form, is applied to mold the powder.

Generally, a lithium adsorbent should possess essential properties such as, maintaining physical and chemical stability in an aqueous solution under various environments, and additionally, providing adsorption sites capable of securing high adsorption efficiency, maintaining high selectivity for a lithium ion so as not to adsorb elements other than lithium, and allowing an easy desorption process for recovery of lithium after adsorption.

However, in the case of preparing an adsorbent in a bead form using the conventional PVC addition method, handling is easy, but it has been reported that the adsorption sites for adsorption and desorption of lithium are decreased by about 30% or more as compared with a powder adsorbent, and thus, when it is used as a lithium adsorbent, a lithium recovery rate will be decreased.

Further, in order to overcome the above problems, Korean Laid-Open Publication No. 10-2005-0045793 discloses an ion-exchange type lithium-manganese oxide adsorbent prepared by immersing an urethane foaming agent in a lithium manganese oxide binder mixed solution, and a preparation method thereof, however, problems have been pointed out, in that since it takes a long time to adsorb lithium, the adsorbent is degenerated or deformed after a long time in the area such as a river and sea water, and particularly various pollutants such as living organisms are attached to or occur in the adsorbent, thereby significantly decreasing the lithium recovery rate with the lapse of time.

Further, Korean Patent Registration No. 10-1083256 discloses a technique to adsorb lithium by charging lithium ion mixed powder within a charger formed of nonwoven fabric, and leaving the charger in a place such as a river or sea water. However, problems are accompanied in that there is resistance to pass the sea water containing lithium ions through the pores of the nonwoven fabric, so that the sea water does not pass smoothly, and particularly, there is physical parameters such as a wave, so that the nonwoven fabric charger is folded, thereby having a serious adverse effect on an adsorption reaction, or the various pollutants are attached to or occur in the adsorbent, thereby rapidly decreasing the lithium recovery rate.

RELATED ART DOCUMENT

Patent Document

Korean Patent Laid-Open Publication No. 10-2005-0045793
Korean Patent Laid-Open Publication No. 10-2003-0028447
Korean Patent Registration No. 10-0245808
Korean Patent Registration No. 10-1083256

SUMMARY

In order to solve the problem that a lithium recovery rate is significantly decreased with the lapse of time by the degeneration or deformation of an adsorbent, or various pollutants, an embodiment of the present invention is directed to providing a lithium adsorption structure having a large surface area which may greatly reduce a decrease of a lithium recovery rate even after a long time has lapsed, by directly coating lithium manganese oxide powder on a substrate using an aerosol deposition method, and a method of preparing the same.

Another embodiment of the present invention is directed to providing a lithium adsorption structure having a large surface area which is easily handled, may be selectively reacted with lithium ions, has a larger adsorption area, and is physically and chemically stable, and a method of preparing the same.

In one general aspect, a method of preparing a lithium adsorption structure having a lithium adsorption layer formed on a surface of a substrate includes: (a) synthesizing lithium manganese oxide powder satisfying the following Chemical Formula 1 or 2, and (b) coating the lithium manganese oxide powder on the surface of the substrate by an aerosol deposition method:

$$Li_nMn_{(2-x)}O_4 \qquad \text{[Chemical Formula 1]}$$

wherein 1≤n<2, and 0<x≤0.6;

 [Chemical Formula 2]

wherein 0.01≤r≤0.5, 0≤y≤0.3, and −0.2≤z≤0.2; and M is any one or two or more elements selected from the group consisting of Ti, Mn, V, Cr, Fe, Co, Ni, Cu, Zn, Zr, Nb, Mo, W, Ag, Sn, Ge, Si and Al.

Other features and aspects will be apparent from the following detailed description, the drawing, and the claims.

BRIEF DESCRIPTION OF THE DRAWINGS

FIG. 1 is a schematic diagram of aerosol deposition equipment used in a method of preparing a lithium adsorption structure having a large surface area according to the present invention.

DETAILED DESCRIPTION OF MAIN ELEMENTS

110: Aerosol chamber
120: Deposition chamber
130: Substrate
140: Carrier gas container
150: No
160: Vacuum pump
170: Stage

DETAILED DESCRIPTION OF EMBODIMENTS

Hereinafter, the method of preparing a lithium adsorption structure having a large surface area of the present invention will be described in detail with reference to the accompanying drawing. The accompanying drawing is provided by way of example so that the idea of the present invention can be sufficiently transferred to a person skilled in the art. Therefore, the present invention is not limited to the drawing provided below but may be modified in other forms, and the accompanying drawing below will be exaggerated in order to clearly describe the spirit of the present invention. Technical terms and scientific terms used herein have the general meaning understood by those skilled in the art to which the present invention pertains unless otherwise defined, and a description for the known function and configuration unnecessarily obscuring the gist of the present invention will be omitted in the following description and the accompanying drawing.

Further, the spirit of the present invention should not be limited to the above-described exemplary embodiments, and the following claims as well as all modified equally or equivalently to the claims are intended to fall within the scope and spirit of the invention.

Further, unless otherwise stated, the unit of % herein refers to % by weight.

The present invention relates to a method of preparing an adsorption structure which may selectively adsorb lithium ions contained in water rich in lithium ions such as a river or sea, and also reversibly and efficiently recover lithium ions, using an aerosol deposition method.

The present invention is for solving the disadvantages of the adsorbent prepared by a conventional method of mixing lithium manganese oxide powder (LMO powder) with a binder, and then immersing a substrate therein, and may provide a high performance lithium adsorption structure having a large surface area which greatly reduces the disadvantage of a rapid decrease of a recovery rate due to pollutant attachment caused over a long time and the like, by directly coating the lithium manganese oxide powder on the substrate, and a method of preparing the same.

Particularly, since the aerosol deposition method used in the present invention is available at low or high temperature, additional processes may be greatly reduced, thereby being capable of efficiently managing the entire process, and more stably preparing the adsorption structure.

Hereinafter, exemplary embodiments of the present invention will be described in detail.

The present invention relates to a method of preparing a lithium adsorption structure having a lithium adsorption layer formed on a surface of a substrate including: (a) producing lithium manganese oxide powder satisfying the following Chemical Formula 1 or 2, and (b) coating the lithium manganese oxide powder on the surface of the substrate by an aerosol deposition method:

$Li_nMn_{(2-x)}O_4$ [Chemical Formula 1]

wherein 1≤n<2, and 0<x≤0.6;

 [Chemical Formula 2]

wherein 0.01≤r≤0.5, 0≤y≤0.3, and −0.2≤z≤0.2; and M is any one or two or more elements selected from the group consisting of Ti, Mn, V, Cr, Fe, Co, Ni, Cu, Zn, Zr, Nb, Mo, W, Ag, Sn, Ge, Si and Al (the term "two or more elements" refers to a state in which two or more among those listed elements are bonded).

In an exemplary embodiment of the present invention, it is preferred that the lithium manganese oxide may be an ion exchange type of $Li_{1.33}Mn_{1.67}O_4$ or $Li_{1.6}Mn_{1.6}O_4$ having a spinel structure, but not limited thereto.

In an exemplary embodiment of the present invention, the lithium manganese oxide powder may have an average particle diameter of 0.5 to 100 μm. When the lithium manganese oxide powder having the average particle diameter within the range is used, a denser film may be obtained, and the problem that a film forming speed becomes slow, or film uniformity is reduced, thereby finally decreasing a lithium recovery rate, may be prevented.

In an exemplary embodiment of the present invention, the above step (a) may include primarily milling lithium manganese oxide raw material powder, calcining the primarily milled powder, and secondarily milling the calcined powder, thereby preparing the lithium manganese oxide powder.

Step (a) is to adjust the powder so as to have an average particle diameter suitable for aerosol spraying, and it is preferred to be subjected to primary milling, drying, calcination, and secondary milling, for preparation of the lithium adsorbent which may be selectively reacted with lithium ions, physically and chemically stable, and reversibly used.

The average particle diameter may be adjusted through controlling milling speed, milling time or the like, and process conditions thereof may be controlled considering the average particle diameter to be required.

In an exemplary embodiment of the present invention, step (a) may include primarily milling the lithium manganese oxide raw material powder for 4 to 10 hours with a ball of 3 to 15 mm, calcining the primarily milled lithium manganese oxide raw material powder, milling the calcined powder for 10 to 16 hours with a ball of 1 to 5 mm, and heat-treating the milled powder, sequentially.

Particularly, when sequentially proceeding with a multi-step ball mill method using the ball within each numerical value range, the lithium adsorption structure which is more stable, dense, and has excellent adhesion to a substrate may be prepared by depositing the lithium manganese oxide powder to the substrate using the aerosol deposition method of step (b). Therefore, the lithium adsorption structure prepared through the above steps has an excellent effect of preventing a recovery rate from being rapidly decreased, by pollutant attached for a long time, particularly in sea water, and the like.

Further, since agglomeration of the powder may be fundamentally prevented in the following calcination and heat treatment substeps by the above sequential process, phase change caused by structural instability may be further reduced.

In an exemplary embodiment of the present invention, the milling substep for the lithium manganese oxide raw material powder may be carried out at 100 to 300 rpm for 1 to 25 hours, and the secondary milling substep may be carried out at 100 to 300 rpm for 0.5 to 20 hours, but not limited thereto, and adjustable depending on the conditions.

In the above calcination substep, since the ion reactivity of the lithium manganese oxide powder may be varied by the change of calcined powder properties depending on the calcination temperature, it is preferred to calcine the powder at a temperature of 500 to 1200° C. for 0.5 to 10 hours, but not limited thereto. When the calcination is carried out within the above temperature range, the lithium manganese oxide powder may be more easily obtained, and agglomeration may be greatly reduced, thereby suppressing the phase change caused by the structural instability of lithium manganese oxide (LMO). Therefore, advantageously, ion exchange type lithium manganese oxide of a $Li_{1.33}Mn_{1.67}O_4$ phase having a spinel structure may be obtained as it is.

In an exemplary embodiment of the present invention, a heat treatment substep may be further included. Specifically, a heat treatment substep carried out after the primary milling substep, the calcination substep, or the secondary milling substep may be further included. For example, heat treatment at 100 to 1000° C., preferably 200 to 800° C. may be further carried out, thereby increasing the average particle diameter of the lithium manganese oxide, and thus, improving kinetic energy during coating in step (b) later. When the heat treatment is carried out within the range, the phenomenon that the powder has an insufficient average particle diameter, or the coating layer is thin or not formed properly may be prevented.

The substrate may be ceramic substrates, a metal substrate including sapphire, silicon, zirconia, titanium (Ti) or stainless steel, or a polymer substrate including one or two or more repeating groups derived from polyethylene, polypropylene, polyamide, polyacetal, saturated polyester, polystyrene, methyl methacrylate, polycarbonate, polyphenyleneoxide, polysulfone, polyphenylene sulfide, polyethylene terephthalate, polycarbonate, nylon, polyurethane, polyvinyl chloride (PVC), quinoline, quinoxaline, phenylene, phenylene vinylene, phenylene sulfide, fluorene, pyridine, pyridyl vinylene, pyrrole, aniline, thiophene, alkyl thiophene, thiophene vinylene, furan, acetylene, quinone, carbazole, azulene, indole, or derivatives therefrom.

Specifically, the substrate may be exemplified as a polymer including one or two or more selected from the group consisting of polyquinoline, polyquinoxaline, polyphenylene, polyphenylene vinylene, polyphenylene sulfide, polyfluorene, polypyridine, polypyridyl vinylene, polypyrrole, polyaniline, polythiophene, polyalkylthiophene, polythiophene vinylene, polyfuran, polyacetylene, polyquinone, polycarbazole, polyazulene, polyindole, poly[(9,9-dioctylfluorenyl-2,7-diyl)-co-bithiophene] (F8T2), poly[bis(4-phenyl)(2,4,6-trimethylphenyl)amine] (PTAA), poly(2,5-bis(3-hexadecylthiophen-2-yl) thieno[3,2-b]thiophene (pBTTT), polystyrene-b-poly(phenylene bisimide acrylate) (PS-b-PPerAcr), poly(bis(4-methoxyphenyl)-4'-vinylphenylamine)-b-poly(perylene bisimide acrylate (PS-b-PPerAcr), poly(vinyl triphenylamine), polystyrene-b-poly(methylmethacrylate) (PS-b-PMMA), and derivatives therefrom.

Particularly, in an exemplary embodiment of the present invention, the substrate may include a copolymer of one or two or more selected from the group consisting of polystyrene-b-polymethyl methacrylate, poly(vinyl triphenylamine), polystyrene-b-poly(phenylene bisimide acrylate), poly[(9,9-dioctylfluorenyl-2,7-diyl)-co-bithiophene] and poly[bis(4-phenyl)(2,4,6-trimethylphenyl)amine], and poly(2,5-bis(3-hexadecylthiophene-2-yl)thieno[3,2-b]thiophene).

The copolymer may be a copolymer having a chain structure unit in a bulk form, and when the substrate is applied together with the sequential ball mill method, an excellent effect of preventing a rapid decrease of the recovery rate caused by pollutant attached for a long time, particularly in sea water, and the like may be generated.

Meanwhile, the substrate 130 is stably placed on a stage 170 movable in an optional direction of x-axis, y-axis and z-axis at a speed of 5 to 50 mm/s, and a coating layer may be formed thereon by an aerosol deposition method, but the stage is not limited thereto, and the process is not particularly limited as long as the aerosol deposition method is possible. The reciprocation number of the substrate is adjustable depending on the thickness of the coating layer to be formed, but not limited to the process constitutions, and not particularly limited as long as the process constitution uses the aerosol deposition method.

Step (b) is to deposit the lithium manganese oxide powder prepared in the above step (a) using the aerosol deposition method.

Particularly, step (b) may include adding the lithium manganese oxide powder to an aerosol chamber 110 and stably placing the substrate in a deposition chamber 120, mixing the lithium manganese oxide powder and carrier gas to form an aerosol, and spraying the aerosol on the substrate, and by carrying out the substeps sequentially, the lithium adsorbent may be prepared.

In an exemplary embodiment of the present invention, step (b) may include supplying carrier gas transported from a carrier gas container 140 to the inside of the aerosol chamber to which the lithium manganese oxide powder is added, so that the lithium manganese oxide powder and the carrier gas are mixed, thereby forming the aerosol. Here, it is preferred that the carrier gas is air, oxygen, nitrogen, helium, argon, or mixed gas thereof, but the kind of the carrier gas is not a factor significantly affecting the aerosol process, and thus, not limited thereto, as long as a particular additional reaction does not occur. Further, since the kind of carrier gas does not significantly affect a coating layer formation process using the aerosol deposition method, it is more preferred to use low cost gas considering the production costs.

In an exemplary embodiment of the present invention, step (b) may include accelerating the lithium manganese oxide powder to 100 to 500 m/s, which is adjustable by the flow rate of the carrier gas. Specifically, the lithium manganese oxide powder within the aerosol chamber is introduced together with the carrier gas, and when the process is carried out within the speed range, the phenomenon that the kinetic energy of particles is insufficient so that the coating layer is formed thin, or not formed properly may be greatly reduced, and the reduction of production costs may be more efficient.

Further, the carrier gas is introduced to the deposition chamber, and it is preferred that the pressure within the deposition chamber is maintained using a vacuum pump 160 so as not to exceed a certain range, for example, maintained less than 0.07 atm, but not limited thereto. When the pressure is maintained in the above range, the probability that the particles are not sufficiently accelerated so that the kinetic energy of the particles is reduced, thereby not forming a coating properly, for example, forming a coating having non-uniform distribution, or having non-uniform density, may be greatly reduced.

In an exemplary embodiment of the present invention, the aerosol may refer to a state in which fine particles having an average diameter of 0.1 to 100 µm and gas are mixed.

Further, step (b) may include transferring the aerosol within the aerosol chamber to a nozzle 150, and then spraying the aerosol on the substrate disposed within the deposition chamber through the nozzle so that the aerosol is dispersed so as to have an appropriate distribution.

In an exemplary embodiment of the present invention, it is preferred in step (b) to spray the aerosol at a temperature of 0 to 300° C., more preferably 0 to 150° C., but not limited thereto. However, when the process is carried out in the above temperature range, the probability that the deposition speed may be reduced so that the preparation process may be prolonged, or the lithium adsorption structure having a non-uniform distribution is prepared therefrom, may be greatly reduced.

As a non-limiting example of the present invention, the method of preparing the lithium adsorption structure may further include repeating step (b) two or more times. Specifically, the method of preparing the lithium adsorption structure using the aerosol deposition method according to the present invention may form a uniform and dense coating film without an additional heat treatment process, however, it is more preferred to form the coating layer through step (b), which is then further subjected to the heat treatment substep. The substrate on which a coating has been already formed is modified by the above heat treatment, and thus, it is possible to prepare the lithium adsorption structure having a layer of more dense and uniform distribution or density. As a specific example of the heat treatment substep, it is more preferable to carry out heat treatment at 300 to 700° C.

In an exemplary embodiment of the present invention, the coating layer formed on the substrate through step (b) may have a thickness of 1 to 1000 µm, preferably 1 to 900 µm, more preferably 1 to 800 µm. When the coating layer is formed to have the thickness of 1 to 1000 µm, self-degeneration caused by oxidation or corrosion, or pollution caused by the attachment of pollutants and others, and the like may be greatly reduced, and a joining property between the coating layer and the substrate may be reduced, thereby greatly reducing separation.

Hereinafter, the present invention will be described in detail by the following Examples.

EXAMPLE 1

$Li_2CO_3$ and $MnCO_3$ were added to a stirrer at a mole ratio of 1.33:1.67, respectively, mixed while being milled with a 10 mm ball mill for 24 hours, and calcined at 600° C. for 10 hours using an electric furnace, thereby synthesizing Li—Mn—O powder of a $Li_{1.33}Mn_{1.67}O_4$ phase.

Next, the powder was milled again with a 5 mm ball mill, thereby preparing Li—Mn—O powder having an average particle diameter of 2.31 µm.

The equipment for aerosol deposition includes a deposition chamber and an aerosol chamber, and has a structure in which the vacuum degree of the deposition chamber was adjusted to be 0.07 atm through a pump, and the mixture of carrier gas and the powder formed in the aerosol chamber was moved to the deposition chamber, so as to be sprayed on the substrate.

The powder was accelerated to 400 m/s at room temperature using an aerosol deposition method, thereby being deposited on the surface of a polstyrene-b-polymethylmethacrylate (PS-b-PMMA) block copolymer substrate (Polymer source, molecular weight: 51 kg/mol, Canada) at a thickness of 7 µm.

EXAMPLE 2

$CH_3COOLi$ and $Mn(CH_3COO)_2.4H_2O$ which were dissolved in ethanol, respectively were taken at a mole ratio of 1:1, respectively, and mixed, and thereafter, strongly stirred. Then, a tartaric acid solution was slowly added thereto, thereby obtaining a gelled derivative of lithium manganese tartrate, and thereafter, moisture remaining in the obtained precipitates was completely removed, and then calcination was carried out at 600° C. for 10 hours, thereby synthesizing Li—Mn—O powder of a $Li_{1.6}Mn_{1.6}O_4$ phase. Next, the powder was milled again with a 5 mm ball mill, and then subjected to the aerosol deposition method, in the same manner as in Example 1, thereby being deposited on the surface of the substrate at a thickness of 8 µm.

EXAMPLE 3

$Li_2CO_3$, $Mn_2O_2$ and $V_2O_3$ were added to a stirrer at a mole ratio of 1.1:0.89:0.01, respectively, mixed while being milled with a 10 mm ball mill for 24 hours, and calcined at 600° C. for 10 hours using an electric furnace, thereby synthesizing Li—Mn—V—O powder of a $Li_{1.1}Mn_{0.89}V_{0.01}O_2$ phase. Next, the powder was milled again with a 5 mm ball mill, and then subjected to the aerosol deposition method, in the same manner as in Example 1, thereby being deposited on the surface of the substrate at a thickness of 6 µm.

EXAMPLE 4

$Li_2CO_3$ and $MnCO_3$ were added to a stirrer at a mole ratio of 1.33:1.67, respectively, mixed while being milled with a ball mill of 10 mm for 24 hours, and calcined at 600° C. for 10 hours using an electric furnace, thereby synthesizing Li—Mn—O powder of a $Li_{1.33}Mn_{1.67}O_4$ phase.

Next, the powder was milled with a 3 mm ball for 12 hours. Thereafter, heat treatment was further carried out at 400° C. for 2 hours using an electric furnace, thereby preparing Li—Mn—O powder having an average particle diameter of 2.01 µm.

The powder was subjected to the aerosol deposition method, in the same manner as in Example 1, thereby being deposited on the surface of the substrate at a thickness of 5 µm.

As a result of analyzing the layer of the lithium adsorption structure formed by the aerosol deposition method according to Examples 1 to 4, it was confirmed that particularly in Example 4, the lithium adsorption layer which is more stable and dense, and has excellent adhesion to the substrate was formed, as compared with Example 3. This is due to the combination of a sequential ball milling multistep grinding process with different ball sizes and further heat treatment, and considered to result from the fact that the agglomeration of the powder may be fundamentally prevented, and the phase change caused by structural instability is greatly reduced.

The lithium adsorption structure having a large surface area of the present invention is characterized in that lithium manganese oxide powder is directly coated on a substrate using an aerosol deposition method, thereby greatly reducing a decrease of a lithium recovery rate even after a long time has lapsed.

Further, the lithium adsorption structure having a large surface area of the present invention is characterized by being easily handled, being selectively reacted with lithium ions, having a larger adsorption area, being physically and chemically stable, and being used reversibly.

What is claimed is:

1. A method of preparing a lithium adsorption structure having a lithium adsorption layer formed on a surface of a substrate comprising:
    (a) synthesizing lithium manganese oxide powder; and
    (b) coating the lithium manganese oxide powder on the surface of the substrate by an aerosol deposition method,
wherein the lithium manganese oxide is $Li_{1.33}Mn_{1.67}O_4$ or $Li_{1.6}Mn_{1.6}O_4$ having a spinel structure.

2. The method of claim 1, wherein the lithium manganese oxide powder has an average particle diameter of 0.5 to 100 μm.

3. The method of claim 1, wherein (a) includes primarily milling lithium manganese oxide raw material powder to be mixed, calcining the mixed lithium manganese oxide raw material powder, and secondarily milling the calcined powder.

4. The method of claim 3, wherein (a) includes milling the lithium manganese oxide raw material powder for 4 to 10 hours with a ball of 3 to 15 mm, calcining the milled lithium manganese oxide raw material powder, milling the calcined powder for 10 to 16 hours with a ball of 1 to 5 mm, and further includes heat-treating the milled powder, sequentially.

5. The method of claim 1, wherein (b) includes adding the lithium manganese oxide powder to an aerosol chamber, stably placing the substrate in a deposition chamber, mixing the lithium manganese oxide powder and carrier gas to form an aerosol, and spraying the aerosol on the substrate.

6. The method of claim 5, wherein the aerosol is sprayed by accelerating the aerosol to 100 to 500 m/s.

7. The method of claim 1, further comprising: repeating (b) two or more times.

8. The method of claim 1, wherein the substrate is a copolymer including one or two or more selected from the group consisting of polystyrene-b-polymethyl methacrylate, poly(vinyl triphenylamine), polystyrene-b-poly(phenylene bisimide acrylate), poly[(9,9-dioctylfluorenyl-2,7-diyl)-co-bithiophene], poly[bis(4-phenyl)(2,4,6-trimethylphenyl) amine], and poly(2,5-bis(3-hexadecylthiophene-2-yl)thieno[3,2-b]thiophene).

9. The method of claim 1, wherein a lithium manganese oxide powder coating layer formed on the substrate through (b) has a thickness of 1 to 1000 μm.

* * * * *